United States Patent Office

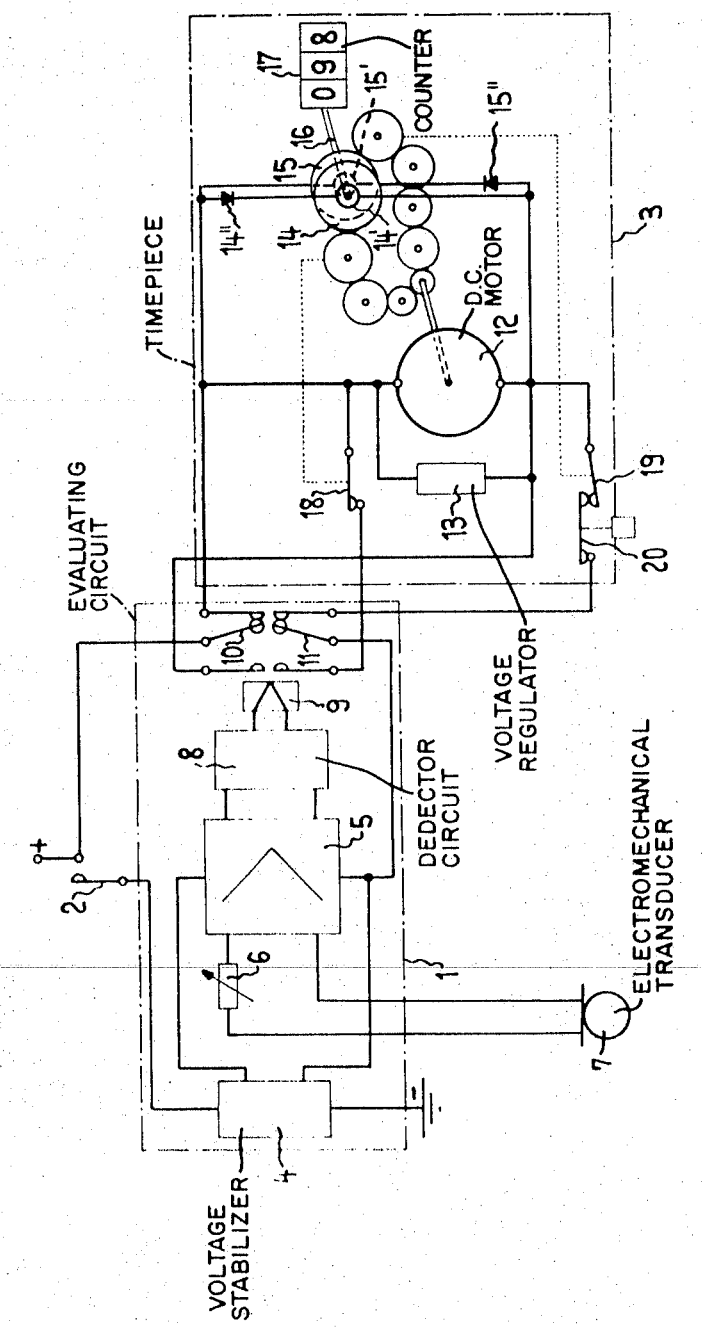

3,616,644
Patented Nov. 2, 1971

3,616,644
AUTOMATIC PARKING-TIME INDICATOR
Karl Adler, Grenchen, and Georges Ducommun, Feldbrunnen, Switzerland, assignors to Biviator S.A., Geneva, Switzerland
Filed Aug. 11, 1969, Ser. No. 848,789
Claims priority, application Switzerland, Aug. 24, 1968, 12,738/68
Int. Cl. G07c 1/30
U.S. Cl. 58—143       8 Claims

ABSTRACT OF THE DISCLOSURE

An automatic parking-time indicator mounted in a vehicle, particularly a motor car, and automatically controlled by a transducer mounted on the differential gear of Cardan joint of the vehicle for automatic indication of the parking time and automatic resetting of the time indicator when the vehicle is removed from a parking field.

---

This invention relates to an automatic parking-time indicator in a vehicle, having a transducer for producing signals, an evaluating circuit controllable by said signals, a timepiece, means for starting said timepiece when the vehicle stops, and means for resetting said timepiece.

In many cases it is difficult to produce definite signals correctly related to the condition to be supervised, for instance whether the vehicle is parked or is moving, the level of such signals being clearly above the level of the strongest noise signals produced during normal operation or use of the vehicle.

In view of these difficulties, no practically operable automatic parking-time indicator has been available in the past, because it is difficult to detect definite signals only produced when the vehicle is displaced, but not when the motor is running while the vehicle is parked.

As an example, it is known to control a stationary parking meter mounted at one end of a parking field by the electro-magnetical noise waves produced by the ignition system or generator when the motor of a parked vehicle is running. However, this system is not able to determine whether the vehicle is moved from the parking field or not. Further, it may well be controlled by vehicles arriving or leaving on neighbouring parking fields.

In another prior parking-time indicator, the timepiece is started when the driver stops the motor by the ignition key. A control light indicates during a predetermined time interval that the allowed parking time has not yet been used. As soon as the timepiece has been running for the allowable parking time the control light extinguishes. It is a drawback of this system that it must manually be switched on and off by the driver and is not automatically controlled by the displacement of the vehicle.

This invention aims in providing an automatic parking-time indicator in a vehicle avoiding the above drawbacks by the use of an electro-mechanical transducer responsive to a movement of the vehicle typical for the condition to be supervised, the level of the signal produced by the movement being above the noise level during normal operation and the evaluating circuit having a response threshold above the noise level.

The accompanying drawing schematically illustrates, by way of example, the important parts of an indicator embodying the features of this invention.

The illustrated indicator is energized from the battery of the vehicle, whereby an evaluating circuit 1 is switched on by the ignition switch 2 of the vehicle while an electrical timepiece 3 serving for indication of the parking time is continuously connected to the battery.

The evaluating circuit 1 has a stabilizing circuit 4 by which the voltage of the battery is regulated to a predetermined value, for instance 5 volts, independently of the number of cells and the loading condition of the battery. The stabilized voltage energizes an amplifier 5 of which the input is connected to a microphone 7 which is not a part of the evaluating circuit, through a potentiometer 6. The microphone 7 is fixed to the casing of the differential gear of the motor car in such a way that it is protected against dirt, humidity and noise from outside, but properly receives the noises of the differential gear. The output of the alternating current amplifier 5 is applied to a detector circuit 8 forming a mean value of the signal output of amplifier 5, this detector circuit having a release threshold and further includes a delay relay or delay circuit for transmission of an output signal with a delay of for instance 10 seconds upon release of the detector circuit by a signal exceeding the threshold value. The output of circuit 8 is connected to a relay winding 9 operating two reversing contacts 10 and 11. This double-pole reversing switch serves for reversal of a direct current driving motor 12 of the timepiece 3. A voltage regulator 13 is connected in parallel with the motor 12 such that the motor rotates at a sufficiently constant speed for obtaining an accurate time indication. Two wheels 14 and 15 are driven from motor 12 through independent, schematically indicated gears. Wheels 14 and 15 are rotatively mounted on the driving shaft of a counter 17 and are coupled with the counter shaft through a suitable clutch system. As an example an electrical clutch 14', 15' may be associated with each of wheels 14 and 15, these clutches being connected to the motor circuit by diodes 14" and 15" in such a way that one clutch is energized for each rotating direction of the motor. Thus, the counter may be driven by each of said wheels in one of two opposite directions. When the motor 12 rotates in one direction, the counter is driven in the sense of increasing numbers through the one gear, the transmission ratio of this gear being such, that the counter indicates the parking time in minutes. When the motor 12 is reversed, the counter is reset to zero at a higher speed. Each of the gears controls a limit switch 18 and 19 respectively through a suitable mechanism indicated by dotted lines only. The limit switch 18 is opened when the counter has been reset to zero by the one gear, while the limit switch 19 is opened when the counter has reached a predetermined maximum value. This maximum value is higher than any usual parking-time limit, for instance above two hours or 120 minutes respectively. Series connected with limit switch 19 is a manually operable switch 20 serving for preventing counting of a parking time when the vehicle is parked where there is no limitation of the parking time or when the vehicle is parked only for a very short time.

The drawing illustrates the condition of the circuits when the vehicle is parked. The ignition switch 2 is open so that the evaluating circuit is deenergized. Relay 9 is also deenergized and its reversing contacts 10 and 11 are in the positions as illustrated. The driving motor 12 is energized by current flowing from the positive terminal through the closed switch 10, motor 12, switches 19 and 20 and switch 11 to the negative terminal of stabilizer 4 and motor 12 rotates in a direction at which wheel 15 is driven and the counter 17 counts the parking time in minutes. When the counter reaches a predetermined maximum number which is higher than all practically usual limited parking times, switch 19 is opened by the schematically indicated mechanical connection and the motor 12 is shut down. The circuits now remain in this condition until the vehicle is started and leaves the parking place. For starting the vehicle the ignition switch 2 is closed so that the evaluating circuit is energized through the regulating circuit 4. When the vehicle drives away, the noises in its differential gear produce alternating signals in microphone 7, such signals being amplified in amplifier 5 and applied to the detecting circuit 8. At the end of a predetermined delay time of say 10 seconds relay 9 is energized whereby contacts 10 and 11 are reversed. Motor 12 is now energized by a current flowing from the positive terminal through switch 10, motor 12, the closed switch 18 and switch 11 to the negative terminal of stabilizer 4 and motor 12 drives the counter by the wheel 14 in a direction and at a speed such that the counter is rapidly reset to zero. When the zero position is reached, switch 18 is opened by the schematically indicated connection and motor 12 is shut down. During the resetting of counter 17 switch 19 has been closed again whereby the apparatus is prepared for indication of another parking-time period as described above. As soon as the vehicle is stopped for parking, the level of the signals induced in microphone 7 are no longer sufficient even with running motor of the vehicle for producing an output signal in the detecting circuit 8 so that relay 9 is deenergized. Contacts 10 and 11 return into the position illustrated in the drawing and the counter 17 is again driven for indicating the parking time. In order to prevent operation of the counter 17 at any short stop of the vehicle, for instance due to traffic signals, railway gates or the like, switch 20 may be opened or when the vehicle is parked where there is no limitation of the parking time.

The microphone 7 attached to the differential gear controls the apparatus in such a way that the counter 17 is only reset to zero when the vehicle is displaced. Even when the vehicle is pushed or towed away from a parking field with inoperable motor, the differential gear is driven from the vehicle wheels and the microphone 7 produces signals at a level clearly above the level of any other signals and sufficient for operating circuit 8 and for energizing relay 9. However, the relay will only be operated after a minimum delay time, for instance of 10 seconds, and complete resetting of the counter to zero requires additional time in the order of one minute. Therefore, it is not possible to reset the counter by simply driving out of a parking field and in again, but the parking field has to be left for good as prescribed before the allowed parking time limit has been reached. The control signals for the evaluating circuit may be produced in another way, for instance by means if an electromagnetical or inductive transducer mounted near the Cardan joint of the Cardan shaft of the car. The Cardan joint has ferromegnetic parts of different diameter by which signals may be induced in the transducer whenever the vehicle is displaced, it being impossible that signals of comparable level may be induced by any other effect, particularly by any noise whatever its intensity may be.

In either case, that is when providing a microphone on the differential gear and when providing an inductive transducer on the Cardan joint of the Cardan shaft, the transducer may be added in a simple manner to any existing vehicle. The evaluating or supervising circuit 1 is preferably accommodated in a separate casing below the instrument board of the vehicle, while the timepiece or indicating apparatus 3 is located at a visible place on the instrument board or above the same.

The system described above in an application for automatic indication of the parking time of a vehicle may be used for other purposes, for instance for supervision of the running periods of machines, trouble detection in machines, burglar alarms and the like. In any case, it is important that the transducer responds to a movement clearly related to the condition to be supervised.

What we claim is:

1. An automatic parking-time indicator in a vehicle, having a transducer for producing signals, an evaluating circuit controllable by said signals and a timepiece, wherein said transducer is an electro-mechanical transducer responsive to a movement typical for the driving vehicle, the level of the signal produced by the movement is above the noise level during normal operation, and the evaluating circuit has a response threshold above the noise level, and means by said evaluating circuit for advancing said timepiece when a signal below said response threshold is applied to said evaluating circuit and for resetting said timepiece when said evaluating circuit is responsive to a signal above said response threshold.

2. An indicator according to claim 1, wherein said timepiece has a reversible driving motor and two independent gear trains between a time counter and the motor, the counter counting in the parking time when driven by one of said gears trains operable when the driving motor is driven in one rotating direction and the counter being reset through the other gear train when the motor is driven in the other rotating direction.

3. An indicator according to claim 2, comprising two limit switches operable each by one of said gear trains, said limit switches being connected each into one of two motor circuits for cutting out the motor when a predetermined maximum time indication is reached and when the counter has been reset respectively.

4. An indicator according to claim 2, wherein said means comprises a relay at the output of said evaluating circuit, said relay having a double-pole reversing switch for reversing the driving motor.

5. An indicator according to claim 2, comprising a manually operable breaking switch in the motor circuit for control of the forward rotating direction of the motor for counting in parking time.

6. An indicator according to claim 1, wherein said transducer is a microphone mounted on the differential gear of a motor car.

7. An indicator according to claim 1, wherein said evaluating circuit and said timepiece are accommodated each in a separate casing, the casings being interconnected by a cable.

8. An indicator according to claim 1, wherein said transducer comprises an inductive transducer mounted near the Cardan joint of the Cardan shaft of a motor car.

References Cited

UNITED STATES PATENTS 3,277,647    10/1966    Bidet _____ 58—143

RICHARD B. WILKINSON, Primary Examiner

E. C. SIMMONS, Assistant Examiner

U.S. Cl. X.R.

194—PMR